(12) United States Patent
Yoshimine et al.

(10) Patent No.: US 9,972,856 B2
(45) Date of Patent: May 15, 2018

(54) FUEL CELL MODULE

(71) Applicant: HONDA MOTOR CO., LTD., Tokyo (JP)

(72) Inventors: Yuki Yoshimine, Wako (JP); Tetsuya Ogawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 299 days.

(21) Appl. No.: 14/905,181

(22) PCT Filed: Jul. 10, 2014

(86) PCT No.: PCT/JP2014/068970
§ 371 (c)(1),
(2) Date: Jan. 14, 2016

(87) PCT Pub. No.: WO2015/008808
PCT Pub. Date: Jan. 22, 2015

(65) Prior Publication Data
US 2016/0172697 A1 Jun. 16, 2016

(30) Foreign Application Priority Data

Jul. 19, 2013 (JP) .................................. 2013-150802

(51) Int. Cl.
*H01M 8/0612* (2016.01)
*H01M 8/1246* (2016.01)
(Continued)

(52) U.S. Cl.
CPC ..... *H01M 8/0618* (2013.01); *H01M 8/04022* (2013.01); *H01M 8/04074* (2013.01);
(Continued)

(58) Field of Classification Search
None
See application file for complete search history.

(56) References Cited

U.S. PATENT DOCUMENTS 9,397,356 B2 * 7/2016 Yoshimine .............. C01B 3/384
9,673,466 B2 * 6/2017 Yoshimine ................ C01B 3/38
(Continued)

FOREIGN PATENT DOCUMENTS

JP 2001-236980 8/2001
JP 2004256348 * 9/2004 ............... C01B 3/38
(Continued)

OTHER PUBLICATIONS

JP 2004/256348 (machine translation), Mikio et al., Sep. 16, 2004.*
(Continued)

*Primary Examiner* — Rena Dye Cronin
(74) *Attorney, Agent, or Firm* — Rankin, Hill & Clark LLP

(57) ABSTRACT

A fuel cell module includes a fuel cell stack and FC peripheral equipment. In the fuel cell module, a stress relaxing portion for relaxing heat stress is provided at least along a boundary between a central area and one of outer annular areas or between the outer annular areas. The stress relaxing portion includes a plurality of curved portions including a first curved portion having the largest radius, and a second curved portion and a third curved portion, which are formed respectively at both ends of the first curved portion such that a space lies on the outer side of each of the second and third curved portions.

10 Claims, 13 Drawing Sheets

(51) Int. Cl.
  *H01M 8/124* (2016.01)
  *H01M 8/04014* (2016.01)
  *H01M 8/04007* (2016.01)

(52) U.S. Cl.
  CPC ....... *H01M 8/0625* (2013.01); *H01M 8/1246* (2013.01); *H01M 2008/1293* (2013.01); *H01M 2250/20* (2013.01); *H01M 2300/0071* (2013.01); *Y02T 90/32* (2013.01)

(56) References Cited

U.S. PATENT DOCUMENTS

| | | | |
|---|---|---|---|
| 9,831,506 B2* | 11/2017 | Yoshimine | ........ H01M 8/04074 |
| 2001/0009732 A1 | 7/2001 | Schuler | |
| 2004/0123523 A1* | 7/2004 | Rong | ................ B01J 8/008 |
| | | | 48/200 |
| 2006/0166053 A1* | 7/2006 | Badding | ............. H01M 8/0271 |
| | | | 429/429 |
| 2007/0172400 A1* | 7/2007 | Kitamura | ............... B01J 8/0438 |
| | | | 422/600 |
| 2009/0148733 A1 | 6/2009 | Tsunoda | |
| 2010/0021784 A1 | 1/2010 | Fourmigue | |
| 2010/0266924 A1* | 10/2010 | Kaupert | ............ H01M 8/04022 |
| | | | 429/452 |

FOREIGN PATENT DOCUMENTS

| | | |
|---|---|---|
| JP | 2004-288434 | 10/2004 |
| JP | 2007-179965 | 7/2007 |
| JP | 2007-287428 | 11/2007 |
| JP | 2010-504607 | 2/2010 |
| JP | 2012-124070 | 6/2012 |

OTHER PUBLICATIONS

Japanese Office Action dated Jul. 5, 2016 with partial English Translation, 6 pages.

* cited by examiner

FUEL CELL MODULE

TECHNICAL FIELD

The present invention relates to a fuel cell module including a fuel cell stack formed by stacking a plurality of fuel cells for generating electricity by electrochemical reactions of a fuel gas and an oxygen-containing gas.

BACKGROUND ART

Typically, a solid oxide fuel cell (SOFC) employs a solid electrolyte of ion-conductive oxide such as stabilized zirconia. The solid electrolyte is interposed between an anode and a cathode to form an electrolyte electrode assembly (MEA). The electrolyte electrode assembly is interposed between separators (bipolar plates). In use, normally, predetermined numbers of the electrolyte electrode assemblies and the separators are stacked together to form a fuel cell stack.

As a system including this fuel cell stack, for example, a fuel cell battery disclosed in Japanese Laid-Open Patent Publication No. 2001-236980 (hereinafter referred to as the conventional technique 1) is known. As shown in FIG. 11, the fuel cell battery includes a fuel cell stack 1a, and a heat insulating sleeve 2a is provided at one end of the fuel cell stack 1a. A reaction device 4a is provided in the heat insulating sleeve 2a. The reaction device 4a includes a heat exchanger 3a.

In the reaction device 4a, as a treatment of liquid fuel, partial oxidation reforming which does not use water is performed. After the liquid fuel is evaporated by an exhaust gas, the liquid fuel passes through a feeding point 5a which is part of the heat exchanger 3a. The fuel contacts an oxygen carrier gas heated by the exhaust gas to thereby undergo partial oxidation reforming, and then, the fuel is supplied to the fuel cell stack 1a.

Further, as shown in FIG. 12, a solid oxide fuel cell disclosed in Japanese Laid-Open Patent Publication No. 2010-504607 (PCT) (hereinafter referred to as the conventional technique 2) has a heat exchanger 2b including a cell core 1b. The heat exchanger 2b heats the cathode air by utilizing waste heat.

Further, as shown in FIG. 13, a fuel cell system disclosed in Japanese Laid-Open Patent Publication No. 2004-288434 (hereinafter referred to as the conventional technique 3) includes a first area 1c having a cylindrical shape extending vertically, an annular second area 2c around the first area 1c, an annular third area 3c around the second area 2c, and an annular fourth area 4c around the third area 3c.

A burner 5c is provided in the first area 1c, and a reforming pipe 6c is provided in the second area 2c. A water evaporator 7c is provided in the third area 3c, and a CO shift converter 8c is provided in the fourth area 4c.

SUMMARY OF INVENTION

In the conventional technique 1, at the time of reforming by partial oxidation in the reaction device 4a, heat of the exhaust gas is used for heating the liquid fuel and the oxygen carrier gas. Therefore, the quantity of heat energy for raising the temperature of the oxygen-containing gas supplied to the fuel cell stack 1a tends to be insufficient, and the efficiency is low.

Further, by the heat of the exhaust gas, the temperature distribution in the reaction device 4a tends to be non-uniform. Therefore, if attempts to increase the heat exchange efficiency are made, large temperature differences occur in vertical and lateral directions to produce the heat stress, and the durability becomes low.

Further, in the conventional technique 2, in order to improve the heat efficiency, a desired heat transmission area is achieved by adopting long flow grooves. Therefore, the pressure loss tends to be considerably large disadvantageously. Further, the heat exchanger 2b including the cell core 1b is provided, and the temperature distribution in the fuel cell tends to be non-uniform. Therefore, if attempts to increase the heat exchange efficiency are made, large temperature differences occur in vertical and lateral directions to produce the heat stress, and the durability becomes low.

Further, in the conventional technique 3, heat radiation from the central portion having the maximum temperature is suppressed using heat insulating material (division wall). In the structure, heat cannot be recovered, and the efficiency is low.

Further, the first area 1c where the burner 5c is provided, the second area 2c where the reforming pipe 6c is provided, the third area 3c where the water evaporator 7c is provided, and the fourth area 4c where the CO shift converter 8c are provided are annularly arranged concentrically. In the structure, the temperature distribution in the fuel cell tends to be non-uniform. Therefore, if attempts to increase the heat exchange efficiency are made, large temperature differences occur in vertical (axial) and lateral (radial) directions to produce the heat stress, and the durability becomes low.

The present invention has been made to solve the problem of this type, and an object of the present invention is to provide a fuel cell module having a simple and compact structure which makes it possible to improve the heat efficiency and facilitate thermally self-sustaining operation, and improve the durability.

A fuel cell module of the present invention includes a fuel cell stack, a reformer, an evaporator, a heat exchanger, an exhaust gas combustor, and a start-up combustor. The fuel cell stack is formed by stacking a plurality of fuel cells for generating electricity by electrochemical reactions of a fuel gas and an oxygen-containing gas.

The reformer reforms a mixed gas of a raw fuel chiefly containing hydrocarbon and water vapor to produce the fuel gas supplied to the fuel cell stack. The evaporator evaporates water, and supplies the water vapor to the reformer. The heat exchanger raises the temperature of the oxygen-containing gas by heat exchange with a combustion gas, and supplies the oxygen-containing gas to the fuel cell stack. The exhaust gas combustor combusts the fuel gas discharged from the fuel cell stack as a fuel exhaust gas and the oxygen-containing gas discharged from the fuel cell stack as an oxygen-containing exhaust gas to produce the combustion gas. The start-up combustor combusts the raw fuel and the oxygen-containing gas to produce the combustion gas.

The fuel cell module includes a central area where the exhaust gas combustor and the start-up combustor are provided, and a plurality of outer annular areas around the central area and where the reformer, the evaporator and the heat exchanger are provided. Further, the fuel cell module includes a stress relaxing portion for relaxing heat stress and which is provided at least along a boundary between the central area and the outer annular area or along a boundary between the outer annular areas.

The stress relaxing portion includes a plurality of curved portions including a first curved portion having the largest radius, and a second curved portion and a third curved portion which are formed respectively at both ends of the first curved portion such that a space lies on the outer side of each of the second and third curved portions.

In the present invention, from the center to the outer circumference, the fuel cell module includes the central area and the plurality of outer annular areas annularly formed around the central area. Therefore, high temperature equipment requiring a larger amount of heat can be provided on the inner side, and low temperature equipment requiring a smaller amount of heat can be provided on the outer side. Accordingly, improvement in the heat efficiency is achieved, and thermally self-sustaining operation is facilitated easily. In addition, a simple and compact structure can be achieved in the fuel cell module. The thermally self-sustaining operation herein means operation where the temperature of the fuel cells is maintained at the operating temperature using only heat energy generated by the fuel cell stack itself, without supplying additional heat from the outside.

Further, the stress relaxing portion for relaxing the heat stress is provided at least at the boundary between the central area and the outer annular area, or between the outer annular areas. In the structure, when the FC peripheral equipment including the exhaust gas combustor, the start-up combustor, the reformer, the evaporator, and the heat exchanger is thermally expanded, the heat stress in the radial direction and in the axial direction is relaxed by the stress relaxing portion. Therefore, it becomes possible to suitably suppress degradation of the durability of the FC peripheral equipment due to the heat stress.

DESCRIPTION OF EMBODIMENTS

Figure 1:
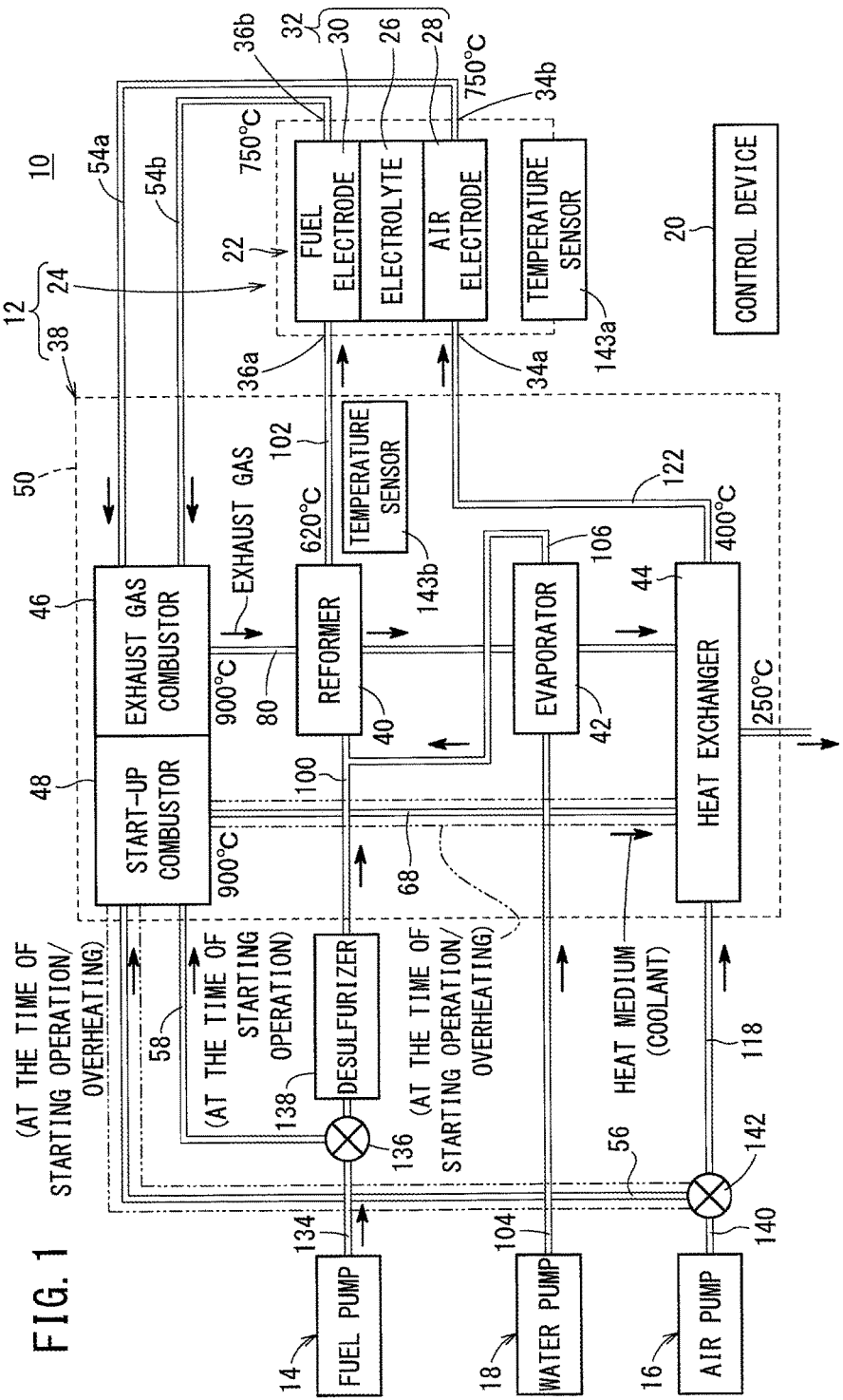
FIG. 1 is a diagram schematically showing structure of a fuel cell system including a fuel cell module according to an embodiment of the present invention.

As shown in FIG. 1, a fuel cell system 10 includes a fuel cell module (SOFC module) 12 according to an embodiment of the present invention, and the fuel cell system 10 is used in various applications, including stationary and mobile applications. For example, the fuel cell system 10 is mounted on a vehicle.

The fuel cell system 10 includes the fuel cell module 12, a raw fuel supply apparatus (including a fuel pump) 14, an oxygen-containing gas supply apparatus (including an air pump) 16, a water supply apparatus (including a water pump) 18, and a control device 20.

The fuel cell module 12 generates electrical energy in power generation by electrochemical reactions of a fuel gas (a gas produced by mixing a hydrogen gas, methane, and carbon monoxide) and an oxygen-containing gas (air). The raw fuel supply apparatus 14 supplies a raw fuel (e.g., city gas) to the fuel cell module 12. The oxygen-containing gas supply apparatus 16 supplies the oxygen-containing gas to the fuel cell module 12. The water supply apparatus 18 supplies water to the fuel cell module 12. The control device 20 controls the amount of electrical energy generated in the fuel cell module 12.

The fuel cell module 12 includes a solid oxide fuel cell stack 24 formed by stacking a plurality of solid oxide fuel cells 22 in a vertical direction (or horizontal direction). The fuel cell 22 includes an electrolyte electrode assembly (MEA) 32. The electrolyte electrode assembly 32 includes a cathode (air electrode) 28, an anode (fuel electrode) 30, and an electrolyte 26 interposed between the cathode 28 and the anode 30. For example, the electrolyte 26 is made of ion-conductive solid oxide such as stabilized zirconia.

The electrolyte electrode assembly 32 is sandwiched between separators (not shown). As the fuel cell 22, various types of conventional SOFCs can be adopted.

The operating temperature of the fuel cell 22 is high, at several hundred ° C. Methane in the fuel gas is reformed at the anode 30 to obtain hydrogen and CO, and the hydrogen and CO are supplied to a portion of the electrolyte 26 adjacent to the anode 30.

An oxygen-containing gas supply passage 34a, an oxygen-containing gas discharge passage 34b, a fuel gas supply passage 36a, and a fuel gas discharge passage 36b extend through the fuel cell stack 24. The oxygen-containing gas supply passage 34a is connected to an oxygen-containing gas inlet at the cathode 28, the oxygen-containing gas discharge passage 34b is connected to an oxygen-containing gas outlet at the cathode 28, the fuel gas supply passage 36a is connected to a fuel gas inlet at the anode 30, and the fuel gas discharge passage 36b is connected to a fuel gas outlet at the anode 30.

The fuel cell module 12 includes the fuel cell stack 24 and FC (fuel cell) peripheral equipment (BOP) 38 connected to the fuel cell stack 24 for allowing the fuel cells 22 to perform power generation. The FC peripheral equipment 38 includes a reformer 40, an evaporator 42, a heat exchanger 44, an exhaust gas combustor 46, and a start-up combustor 48. These components are placed in a casing 50.

The reformer 40 reforms a mixed gas of a raw fuel chiefly containing hydrocarbon (e.g., city gas) and water vapor to produce a fuel gas supplied to the fuel cell stack 24. The evaporator 42 evaporates water and supplies the water vapor to the reformer 40. The heat exchanger 44 heats the oxygen-containing gas by heat exchange with a combustion gas, and supplies the oxygen-containing gas to the fuel cell stack 24. The exhaust gas combustor 46 combusts the fuel gas discharged from the fuel cell stack 24 as a fuel exhaust gas and the oxygen-containing gas discharged from the fuel cell stack 24 as an oxygen-containing exhaust gas to produce the combustion gas. The start-up combustor 48 combusts the raw fuel and the oxygen-containing gas to produce the combustion gas.

Figure 3:
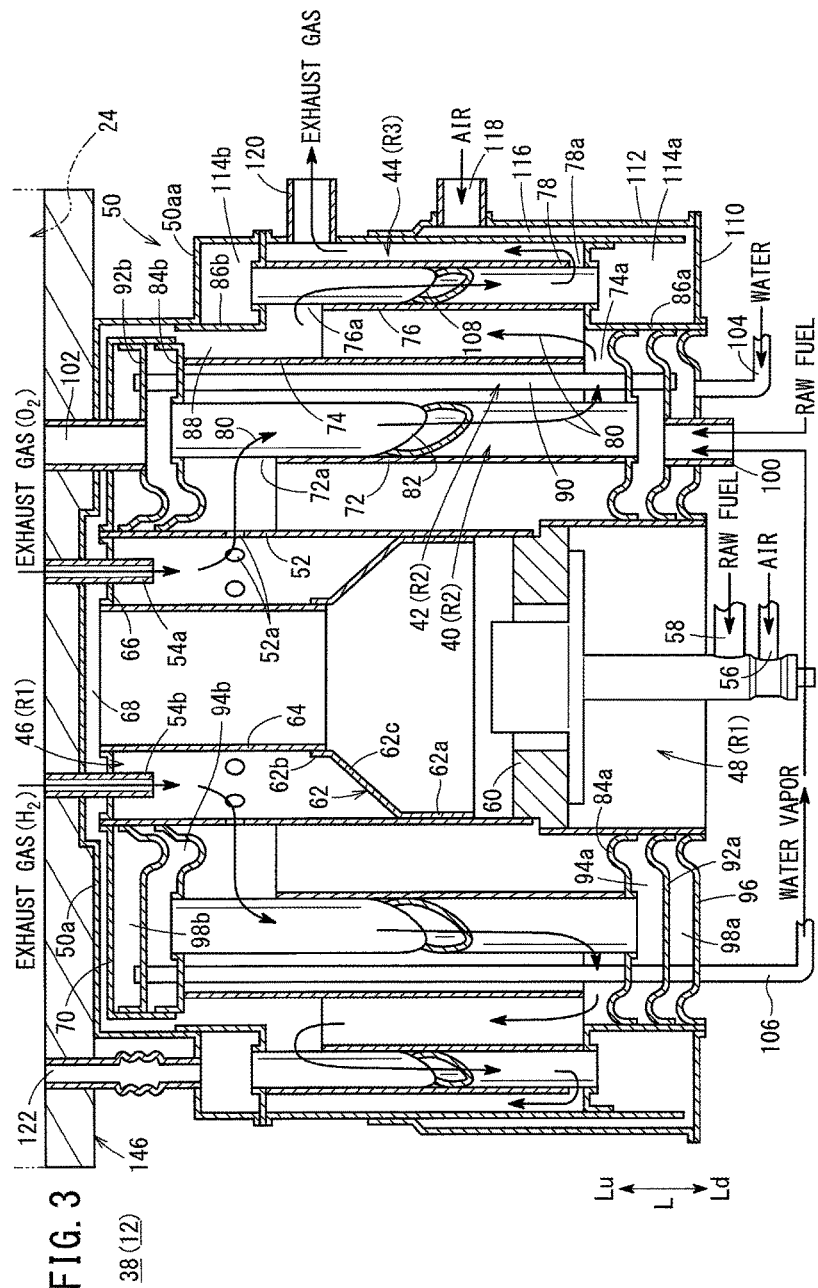
FIG. 3 is a cross sectional view showing the FC peripheral equipment.
Figure 4:
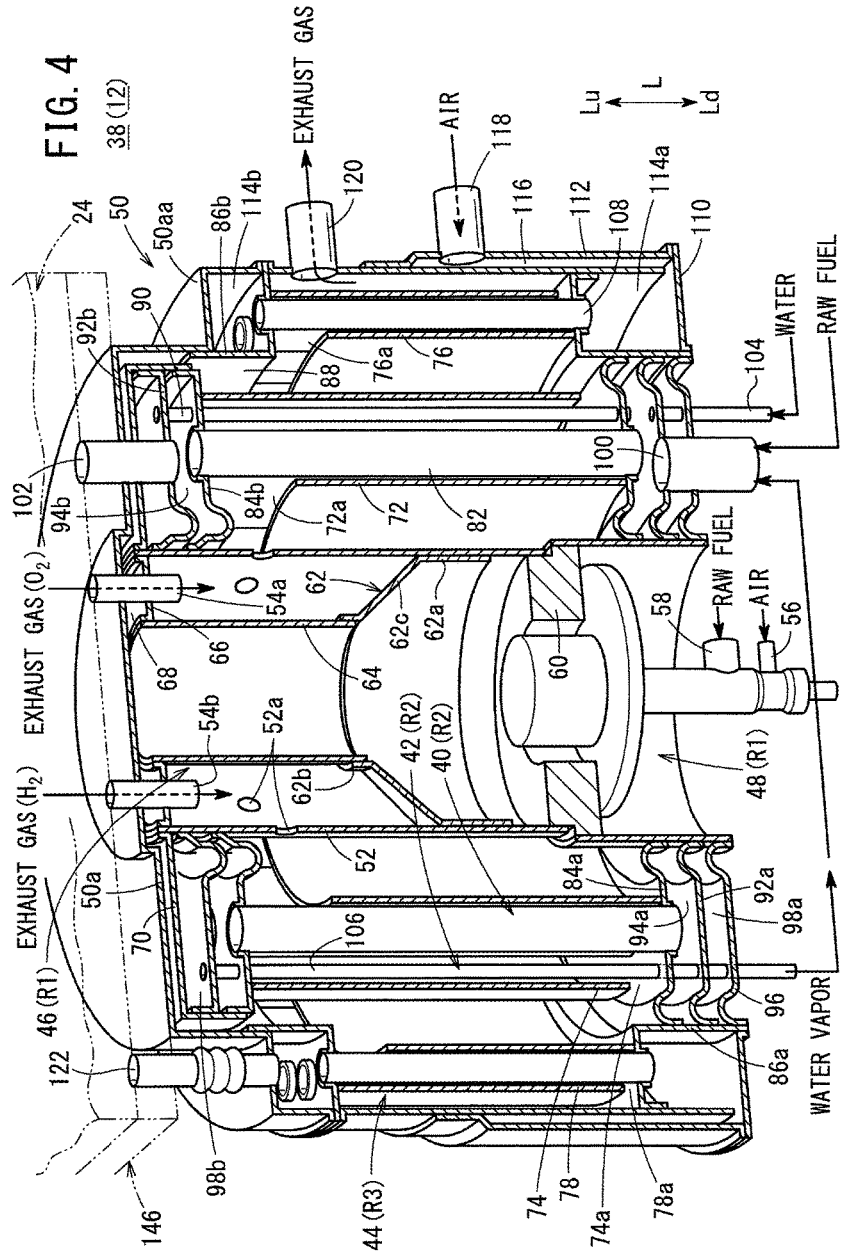
FIG. 4 is a perspective view with partial omission showing the FC peripheral equipment.
Figure 5:
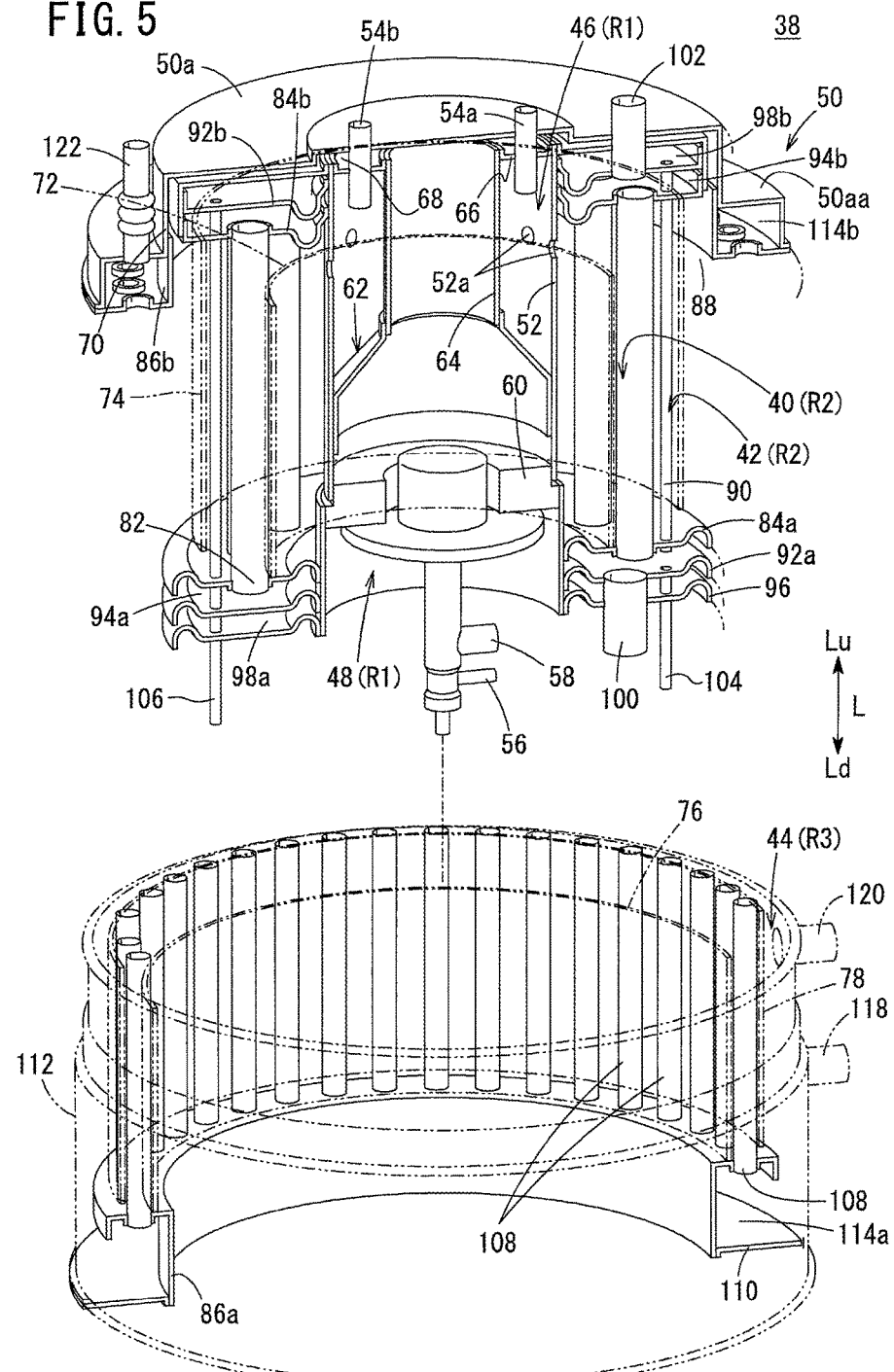
FIG. 5 is an exploded perspective view showing main components of the FC peripheral equipment.

As shown in FIGS. 3 to 5, in the FC peripheral equipment 38, the casing 50 includes therein a first area (central area) R1. In the first area R1, the exhaust gas combustor 46 is disposed in proximity to the fuel cell stack 24, and the start-up combustor 48 is disposed remotely from the fuel cell stack 24. The casing 50 also includes therein a second area (outer annular area) R2 annularly formed around the first area R1. In the second area R2, the reformer 40 and the evaporator 42 are provided. Further, the casing 50 includes a third area (outer annular area) R3 annularly formed around the second area R2. In the third area R3, the heat exchanger 44 is provided.

The first area R1 is defined by a cylindrical tubular portion 52 disposed on one end closer to the fuel cell stack 24. The tubular portion 52 extends from the exhaust gas combustor 46 toward the start-up combustor 48. A plurality of holes (e.g., circular holes or rectangular holes) 52a are formed in an outer wall of the tubular portion 52 positioned closer to the fuel cell stack 24.

One end of an oxygen-containing exhaust gas channel 54a and one end of a fuel exhaust gas channel 54b are provided in the tubular portion 52 to form the exhaust gas combustor 46 (see FIGS. 1 and 3). In the tubular portion 52, a combustion gas is produced by combustion reaction of the fuel gas (specifically, fuel exhaust gas) and the oxygen-containing gas (specifically, oxygen-containing exhaust gas). As shown in FIG. 1, the other end of the oxygen-containing exhaust gas channel 54a is connected to the oxygen-containing gas discharge passage 34b of the fuel cell stack 24. The other end of the fuel exhaust gas channel 54b is connected to the fuel gas discharge passage 36b of the fuel cell stack 24.

The start-up combustor 48 includes an air supply pipe 56 and a raw fuel supply pipe 58. The start-up combustor 48 has an ejector function, and generates negative pressure in the raw fuel supply pipe 58 by the flow of air supplied from the air supply pipe 56 for suctioning the raw fuel.

As shown in FIGS. 3 to 5, the start-up combustor 48 includes a sleeve member 60. The sleeve member 60 is slidably fitted into an end of the tubular portion 52. The start-up combustor 48 is separated from the exhaust gas combustor 46 by a multi-step tubular member 62 of the exhaust gas combustor 46. The multi-step tubular member 62 includes a large diameter ring portion 62a, a small diameter ring portion 62b, and an inclined ring portion 62c connecting the large diameter ring portion 62a and the small diameter ring portion 62b.

The large diameter ring portion 62a is fitted into the tubular portion 52 so as to be slidable on the inner circumferential surface of the tubular portion 52, and the small diameter ring portion 62b is welded to one end of a tubular member 64. The tubular member 64 is provided inside and coaxially with the tubular portion 52. The other end of the tubular member 64 is fixed to a closure ring 66. The exhaust gas combustor 46 is provided in a space surrounded by the inner circumferential surface of the tubular portion 52, the outer circumferential surface of the multi-step tubular member 62, and the closure ring 66.

A substantially circular disc shaped wall surface 50a formed as an outer surface of the casing 50 is provided on a side closer to the fuel cell stack 24, and a bypass channel 68 is formed along the inner surface of the wall surface 50a. The bypass channel 68 is provided to bypass a combustion gas channel 80 described later. The bypass channel 68 is formed between the closure ring 66 and a partition plate 70 surrounding the closure ring 66, and the inner surface of the wall surface 50a. The shape of the partition plate 70 corresponds to the inner surface shape of the wall surface 50a, and the partition plate 70 is formed in a ring shape by bending the outer circumference of a hollow circular disk in an axial direction.

The bypass channel 68 extends from the central area along the wall surface 50a adjacent to the fuel cell stack 24, and at a position between the outermost annular area and the second outermost annular area (i.e., the annular area inside the outermost annular area), the bypass channel 68 is merged into the combustion gas channel 80. Specifically, the bypass channel 68 extends from the inside the tubular member 64 in the first area R1, i.e., from the start-up combustor 48, to a boundary between the third area R3 and the second area R2 along the wall surface 50a.

A cylindrical first partition plate 72 is positioned in the casing 50, between the first area R1 and the second area R2. A cylindrical second partition plate 74 and a cylindrical third partition plate 76 are positioned between the second area R2 and the third area R3. A cylindrical fourth partition plate 78 is provided between the third area R3 and the inner surface of the casing 50.

The first partition plate 72 has a first combustion gas connection channel (or a plurality of holes) 72a formed by cutting out its end closer to the exhaust gas combustor 46. The second partition plate 74 has a second combustion gas connection channel (or a plurality of holes) 74a formed by cutting out its end closer to the start-up combustor 48. The third partition plate 76 has a third combustion gas connection channel (or a plurality of holes) 76a formed by cutting out its end closer to the exhaust gas combustor 46. The fourth partition plate 78 has a fourth combustion gas connection channel (or a plurality of holes) 78a formed by cutting out its end closer to the start-up combustor 48.

In the casing 50, the combustion gas channel 80 is formed by the first partition plate 72, the second partition plate 74, the third partition plate 76, and the fourth partition plate 78 for allowing the combustion gas to flow from the exhaust gas combustor 46 (central area) to the second area R2 (outer annular area closer to the center), and then, flow from the second area R2 to the third area R3 (outer annular area closer to the outside).

The reformer 40 is a preliminary reformer for steam-reforming higher hydrocarbon ($C_{2+}$) such as ethane ($C_2H_6$), propane ($C_3H_8$), and butane ($C_4H_{10}$) contained in the city gas (raw fuel) to produce the fuel gas chiefly containing methane ($CH_4$), hydrogen, and CO. The operating temperature of the reformer 40 is set to several hundred ° C.

As shown in FIGS. 3 to 5, the reformer 40 includes a plurality of reforming pipes (heat transmission pipes) 82 provided around the exhaust gas combustor 46 and the start-up combustor 48. Each of the reforming pipes 82 is filled with reforming catalyst pellets (not shown). One end (lower end) of each of the reforming pipes 82 is fixed to a first lower ring member 84a, and the other end (upper end) thereof is fixed to a first upper ring member 84b.

The inner circumferential portion of the first lower ring member 84a is fixed to the outer circumferential portion of the start-up combustor 48 by welding or the like. The outer circumferential portion of the first lower ring member 84a is fixed to the inner surface of a substantially cylindrical lower partition plate 86a by welding or the like. The inner circumferential portion of the first upper ring member 84b is fixed to the outer circumferential portion of the tubular portion 52 by welding or the like, and the outer circumferential portion of the first upper ring member 84b is fixed to the inner circumferential surface at the upper end of the partition plate 70 by welding or the like. A substantially cylindrical upper partition plate 86b is provided adjacent to the first upper ring member 84b, and a connection channel 88 connecting the bypass channel 68 to the combustion gas channel 80 is formed between the upper partition plate 86b and the second partition plate 74.

Figure 6:
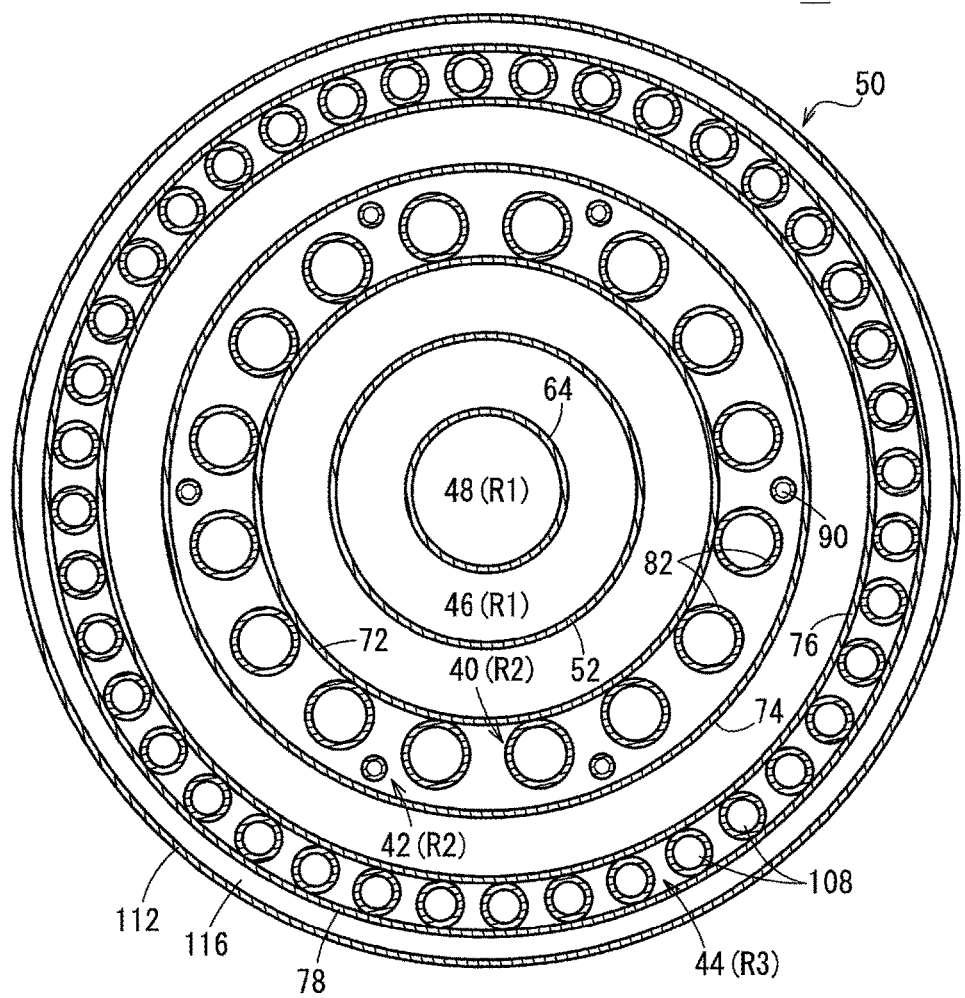
FIG. 6 is cross sectional plan view showing the FC peripheral equipment.

The evaporator 42 has a plurality of evaporation pipes (heat transmission pipes) 90 provided adjacent to the reforming pipes 82 of the reformer 40. As shown in FIG. 6, the reforming pipes 82 are arranged at equal intervals on a virtual circle, concentrically around the first area R1. The evaporation pipes 90 are arranged at predetermined positions between the reforming pipes 82.

As shown in FIGS. 3 and 4, one end (lower end) of each of the evaporation pipes 90 is connected to a second lower ring member 92a by welding or the like, and the other end (upper end) of each of the evaporation pipes 90 is connected to a second upper ring member 92b by welding or the like.

The inner circumferential portion of the second lower ring member 92a is fixed to the outer circumferential portion of the start-up combustor 48 by welding or the like, and the outer circumferential portion of the second lower ring member 92a is fixed to the inner surface of the lower partition plate 86a by welding or the like. The inner circumferential portion of the second upper ring member 92b is fixed to the outer circumferential portion of the tubular portion 52 by welding or the like. Further, the outer circumferential portion of the second upper ring member 92b is fixed to the inner circumferential surface at the front end of the partition plate 70 by welding or the like.

The second lower ring member 92a is positioned below the first lower ring member 84a (outside the first lower ring member 84a in the axial direction), and the second upper ring member 92b is positioned above the first upper ring member 84b (outside the first upper ring member 84b in the axial direction).

An annular mixed gas supply chamber 94a is formed between the first lower ring member 84a and the second lower ring member 92a, and a mixed gas of raw fuel and water vapor is supplied to the mixed gas supply chamber 94a. Further, an annular fuel gas discharge chamber 94b is formed between the first upper ring member 84b and the second upper ring member 92b, and the produced fuel gas (reformed gas) is discharged to the fuel gas discharge chamber 94b. Both ends of each of the reforming pipes 82 are opened respectively to the mixed gas supply chamber 94a and the fuel gas discharge chamber 94b.

A ring shaped end ring member 96 is fixed to a lower end of the lower partition plate 86a by welding or the like. An annular water supply chamber 98a is formed between the end ring member 96 and the second lower ring member 92a, and water is supplied to the water supply chamber 98a. A water vapor discharge chamber 98b is formed between the second upper ring member 92b and the partition plate 70, and water vapor is discharged to the water vapor discharge chamber 98b. Both ends of each of the evaporation pipes 90 are opened respectively to the water supply chamber 98a and the water vapor discharge chamber 98b.

The fuel gas discharge chamber 94b and the water vapor discharge chamber 98b are arranged in a double-deck manner, and the fuel gas discharge chamber 94b is positioned inside (below) the water vapor discharge chamber 98b. The mixed gas supply chamber 94a and the water supply chamber 98a are arranged in a double-deck manner, and the mixed gas supply chamber 94a is positioned inside (above) the water supply chamber 98a.

A raw fuel supply channel 100 is opened to the mixed gas supply chamber 94a, and an evaporation return pipe 106 described later is connected to a position in the middle of the raw fuel supply channel 100 (see FIG. 1). The raw fuel supply channel 100 has an ejector function, and generates negative pressure by the flow of raw fuel for suctioning water vapor.

The raw fuel supply channel 100 is fixed to the second lower ring member 92a and the end ring member 96 by welding or the like. One end of a fuel gas channel 102 is connected to the fuel gas discharge chamber 94b, and the other end of the fuel gas channel 102 is connected to the fuel gas supply passage 36a of the fuel cell stack 24 (see FIG. 1). The fuel gas channel 102 is fixed to the second upper ring member 92b by welding or the like.

A water channel 104 is connected to the water supply chamber 98a. The water channel 104 is fixed to the end ring member 96 by welding or the like. One end of the evaporation return pipe 106 having at least one evaporation pipe 90 is provided in the water vapor discharge chamber 98b, and the other end of the evaporation return pipe 106 is connected to a position in the middle of the raw fuel supply channel 100 (see FIG. 1).

As shown in FIGS. 3 and 4, the heat exchanger 44 includes a plurality of heat exchange pipes (heat transmission pipes) 108. One end (lower end) of each of the heat exchange pipes 108 is fixed to the lower partition plate 86a, and the other end (upper end) thereof is fixed to the upper partition plate 86b.

A lower end ring member 110 is provided outside the lower partition plate 86a, and an upper end ring portion 50aa is provided outside the upper partition plate 86b. The upper end ring portion 50aa is connected to the wall surface 50a in a stepwise manner. The lower end ring member 110 is fixed to the inner plate portion of the lower partition plate 86a and the inner circumference of a cylindrical cover member 112 by welding or the like.

An annular oxygen-containing gas supply chamber 114a is formed between the lower partition plate 86a and the lower end ring member 110. An oxygen-containing gas is supplied to the oxygen-containing gas supply chamber 114a. An annular oxygen-containing gas discharge chamber 114b is formed between the upper partition plate 86b and the upper end ring portion 50aa. The heated oxygen-containing gas is discharged to the oxygen-containing gas discharge chamber 114b. Both ends of each of the heat exchange pipes 108 are fixed respectively to the lower partition plate 86a and the upper partition plate 86b by welding or the like, and opened respectively to the oxygen-containing gas supply chamber 114a and the oxygen-containing gas discharge chamber 114b.

The mixed gas supply chamber 94a and the water supply chamber 98a are positioned radially inwardly with respect to the oxygen-containing gas supply chamber 114a. The oxygen-containing gas discharge chamber 114b is provided at a position shifted outward and downward with respect to the fuel gas discharge chamber 94b.

Both of upper and lower ends (both ends in the axial direction) of the cover member 112 are fixed to the outer circumference of the casing 50 by welding or the like, and a heat recovery area (chamber) 116 is formed between the cover member 112 and the outer circumference of the casing 50.

Figure 2:
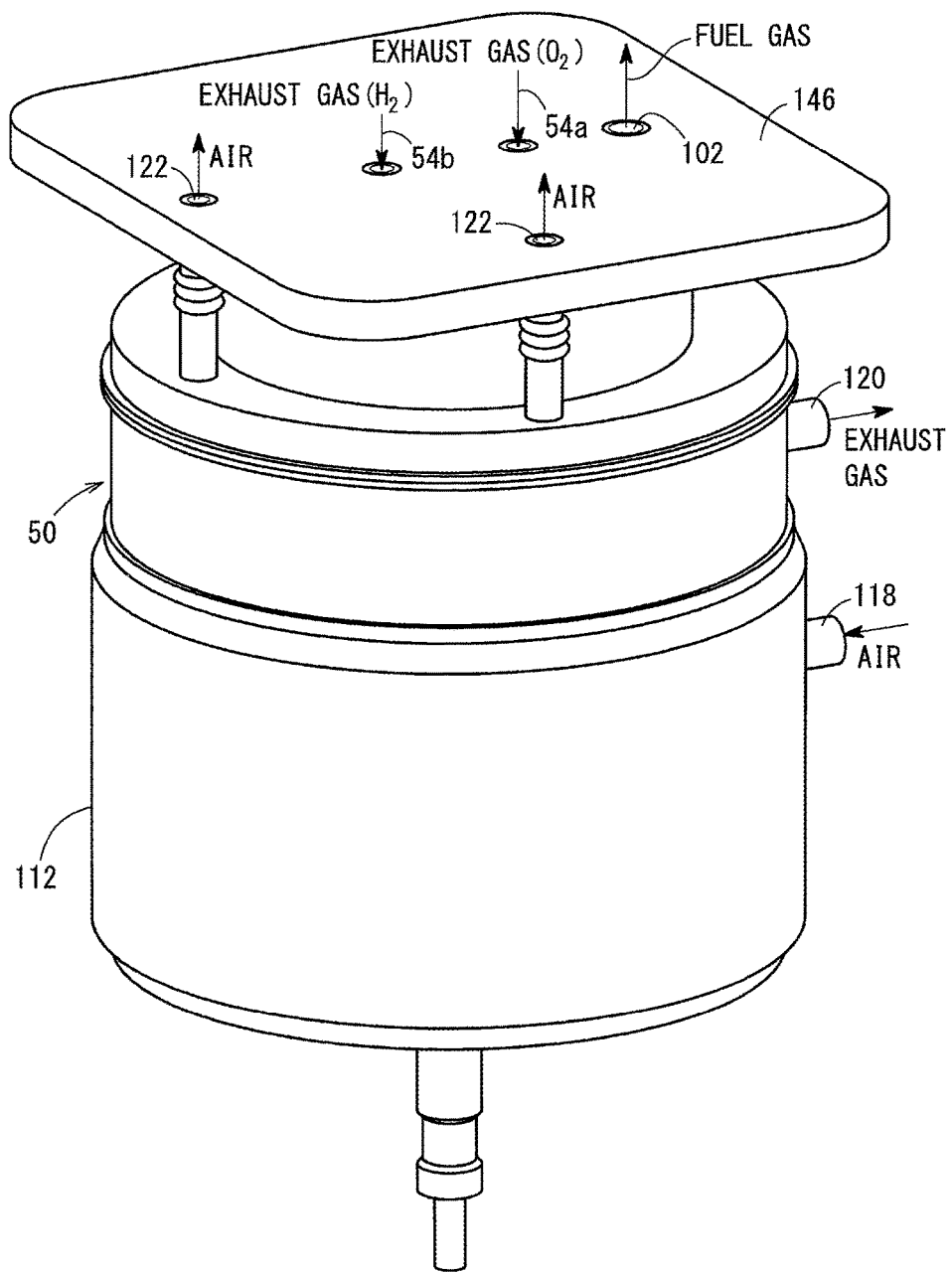
FIG. 2 is a perspective view schematically showing FC peripheral equipment of the fuel cell module.

The oxygen-containing gas supply chamber 114a is connected to the heat recovery area 116. An oxygen-containing gas supply pipe 118 communicating with the heat recovery area 116 is connected to the cover member 112. An exhaust gas pipe 120 communicating with the third area R3 is connected to an upper portion of the casing 50. For example, one end of each of two oxygen-containing gas pipes 122 is provided in the oxygen-containing gas discharge chamber 114b (see FIG. 2). The other end of each of the oxygen-containing gas pipes 122 is connected to the oxygen-containing gas supply passage 34a of the fuel cell stack 24 (see FIG. 1).

In the embodiment of the present invention, a stress relaxing portion 124 for relaxing stress due to heat is provided at least along a boundary between the central area and the outer annular area, or along the boundary between the plurality of outer annular areas. The stress relaxing portions 124 are provided, in particular, in the first upper ring member 84b and the second upper ring member 92b which tend to be exposed to high heat (see FIG. 7)

Figure 7:
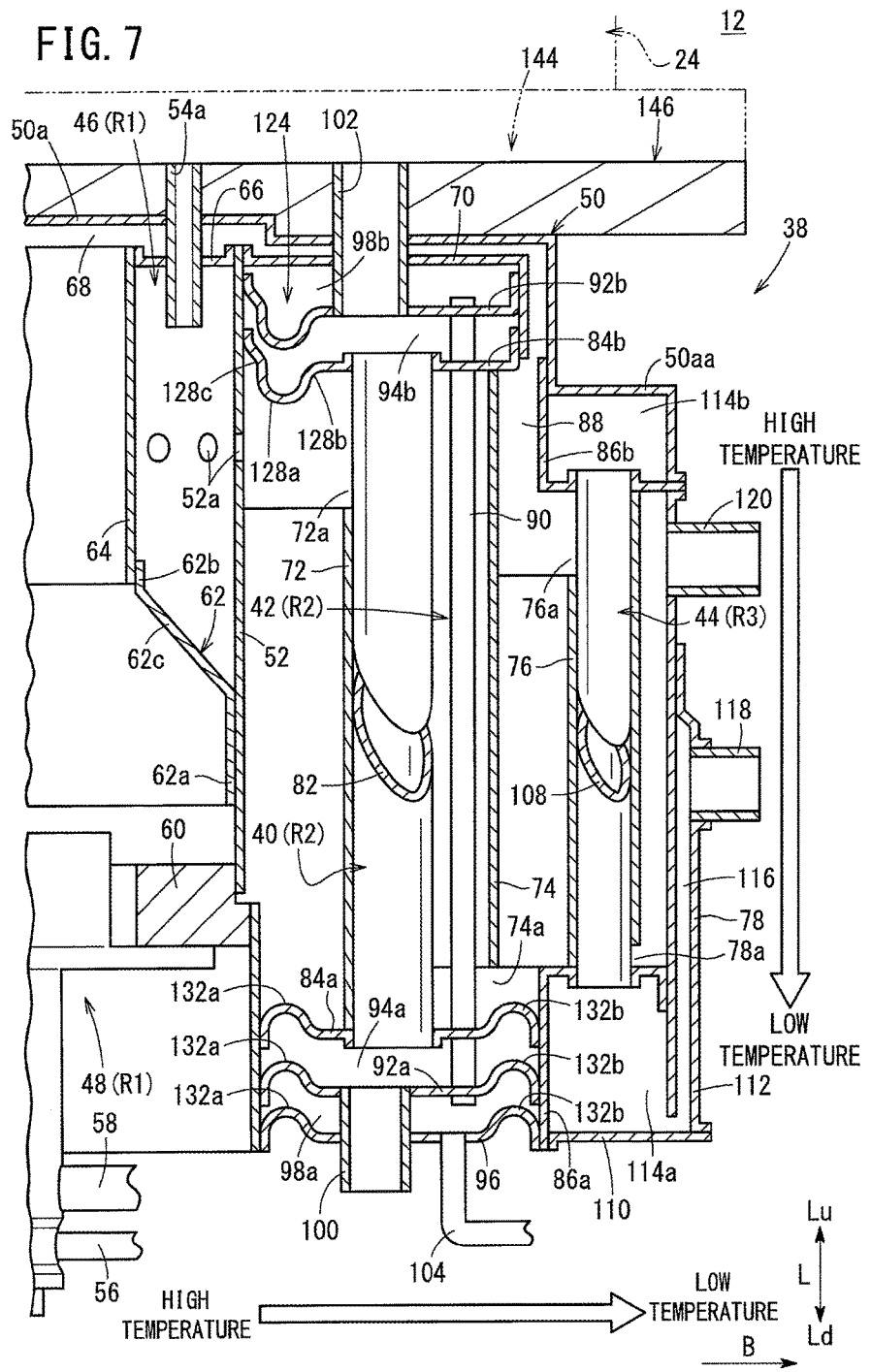
FIG. 7 is a cross sectional view showing main components of the FC peripheral equipment.
Figure 8:
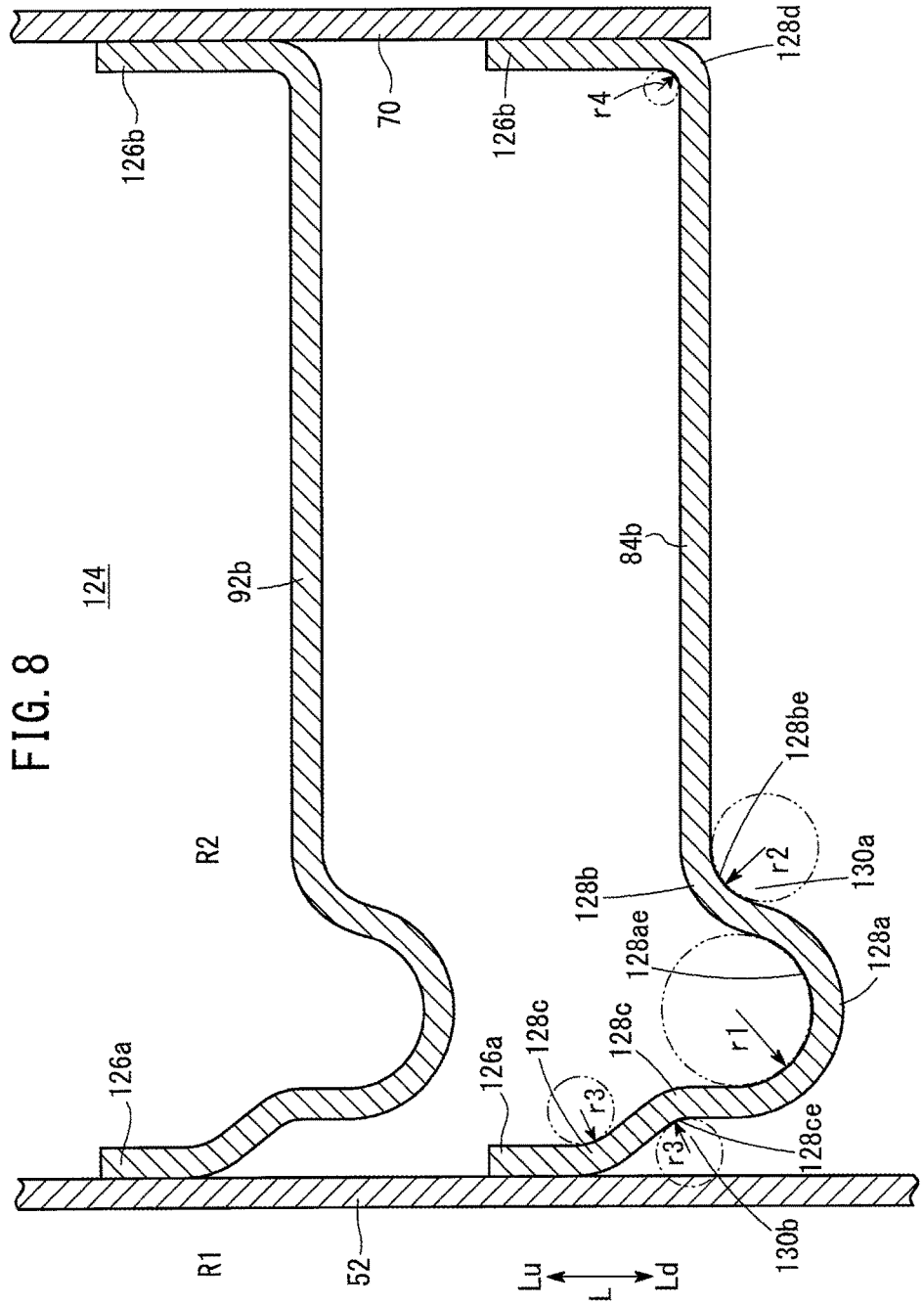
FIG. 8 is a view showing a stress relaxing portion of the FC peripheral equipment.

As shown in FIGS. 7 and 8, the stress relaxing portion 124 includes a plurality of curved portions each having a circular arc shape in cross section, adjacent to the inner circumferential portion of each of the first upper ring member 84b and the second upper ring member 92b (i.e., at an end portion closer to a welding point 126a with the tubular portion 52). Specifically, as shown in FIG. 8, the stress relaxing portion 124 includes a first curved portion 128a having the largest radius r1 of a virtual circle, and a second curved portion 128b and a third curved portion 128c formed respectively at both ends of the first curved portion 128a such that a space 130a, 130b lies on the outer side of each of the second and third curved portions 128b, 128c. The second curved portion 128b and the third curved portion 128c are curved in a direction opposite to the curved direction of the first curved portion 128a.

The second curved portion 128b is provided integrally with an outer end (i.e., an end closer to the partition plate 70) of the first curved portion 128a, and the third curved portion 128c is provided integrally with an inner end (i.e., an end closer to the tubular portion 52) of the first curved portion 128a. The radius r2 of a virtual circle of the second curved portion 128b is larger than the radius r3 of a virtual circle of the third curved portion 128c (r1>r2>r3).

The arc length 128ae of the first curved portion 128a is greater than the arc length 128be of the second curved portion 128b. The arc length 128be of the second curved portion 128b is greater than the arc length 128ce of the third curved portion 128c. The third curved portion 128c is provided adjacent to each of the welding point 126a of the first upper ring member 84b and the second upper ring member 92b.

Each of the first upper ring member 84b and the second upper ring member 92b has a fourth curved portion 128d on its side closer to a welding point 126b with the partition plate 70. The fourth curved portion 128d has a radius r4 which is equal to or smaller than the radius r3 of the third curved portion 128c. Each of the first upper ring member 84b and the second upper ring member 92b may have the stress relaxing portion 124 at its end closer to the partition plate 70.

As shown in FIG. 7, each of the first lower ring member 84a, the second lower ring member 92a, and the end ring member 96 has a curved portion 132a at its inner end (i.e., an end closer to the start-up combustor 48). Each of the first lower ring member 84a, the second lower ring member 92a, and the end ring member 96 has a curved portion 132b at its outer end (i.e., an end closer to the lower partition plate 86a). The curved portions 132a, 132b make up the stress relaxing portion 124. Each of the first lower ring member 84a, the second lower ring member 92a, and the end ring member 96 may have the above-described stress relaxing portion 124.

As shown in FIG. 1, the raw fuel supply apparatus 14 includes a raw fuel channel 134. The raw fuel channel 134 is branched into the raw fuel supply channel 100 and the raw fuel supply pipe 58 through a raw fuel regulator valve 136. A desulfurizer 138 for removing sulfur compounds contained in the city gas (raw fuel) is provided in the raw fuel supply channel 100.

The oxygen-containing gas supply apparatus 16 includes an oxygen-containing gas channel 140. The oxygen-containing gas channel 140 is branched into the oxygen-containing gas supply pipe 118 and the air supply pipe 56 through an oxygen-containing gas regulator valve 142. The water supply apparatus 18 is connected to the evaporator 42 through the water channel 104. A temperature sensor 143a is provided in the fuel cell stack 24, and a temperature sensor 143b is provided in the reformer 40.

Figure 9:
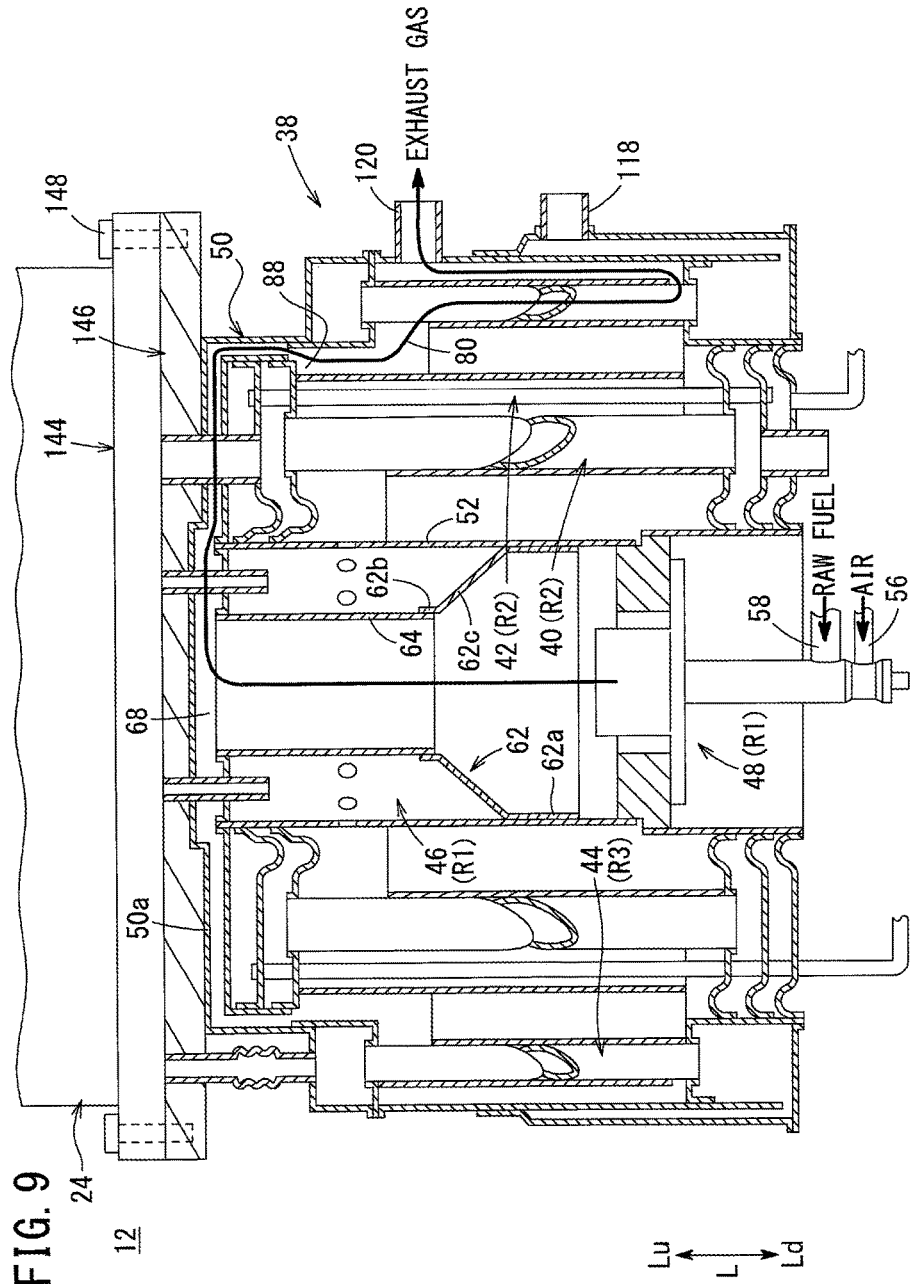
FIG. 9 is a view showing operation at the time of starting operation of the fuel cell module.

As shown in FIG. 9, a first plate 144 is fixed to an end of the fuel cell stack 24. A second plate 146 is fixed to the end of the casing 50 of the FC peripheral equipment 38. The first plate 144 and the second plate 146 are tightened together using locking screws 148. Channels (not shown) as passages of the fuel gas, the oxygen-containing gas, the fuel exhaust gas, and the oxygen-containing exhaust gas are formed in the first plate 144 and the second plate 146. The bypass channel 68 is formed along the second plate 146 (see FIG. 3).

Operation of the fuel cell system 10 will be described below.

At the time of starting operation of the fuel cell system 10, air (oxygen-containing gas) and raw fuel are supplied to the start-up combustor 48. Specifically, as shown in FIG. 1, in the oxygen-containing gas supply apparatus 16, by operation of the air pump, the air is supplied to the oxygen-containing gas channel 140. By adjusting the opening degree of the oxygen-containing gas regulator valve 142, the air is supplied to the air supply pipe 56.

In the meanwhile, in the raw fuel supply apparatus 14, by operation of the fuel pump, for example, raw fuel such as the city gas (containing $CH_4$, $C_2H_6$, $C_3H_8$, $C_4H_{10}$) is supplied to the raw fuel channel 134. By regulating the opening degree of the raw fuel regulator valve 136, the raw fuel is supplied into the raw fuel supply pipe 58. The raw fuel is mixed with the air, and supplied into the start-up combustor 48.

Thus, as shown in FIG. 9, the mixed gas of the raw fuel and the air is supplied into the start-up combustor 48, and the mixed gas is ignited to start combustion. Therefore, the combustion gas produced in combustion flows from the large diameter ring portion 62a to the small diameter ring portion 62b in the multi-step tubular member 62 (in the direction indicated by an arrow Lu), and the combustion gas is supplied to the bypass channel 68 through the tubular member 64.

The combustion gas supplied to the bypass channel 68 moves outward (outward in the radial direction) from the exhaust gas combustor 46 in the central area along the wall surface 50a of the casing 50. After the combustion gas flows into the connection channel 88 at the boundary between the third area R3 as the outermost annular area and the second area R2 as the annular area inside the third area R3, the combustion gas is merged into the combustion gas channel 80. In the structure, since the combustion gas flows along the second plate 146, the temperature of the second plate 146 is increased.

Since the first plate 144 is fixed to the second plate 146, the heat is transmitted from the second plate 146 to the first plate 144 suitably. At this time, since the first plate 144 is fixed to the end of the fuel cell stack 24, the temperature of the fuel cell stack 24 is increased rapidly by the heat from the combustion gas.

The temperature of the fuel cell stack 24 is detected by the temperature sensor 143a (see FIG. 1). When the control device 20 judges that the temperature of the fuel cell stack 24 is increased to a predetermined temperature, operation is switched from start-up operation to rated operation. That is, the air (oxygen-containing gas) is supplied to the heat exchanger 44, and the mixed gas of the raw fuel and the water vapor is supplied to the reformer 40.

Specifically, as shown in FIG. 1, the opening degree of the oxygen-containing gas regulator valve 142 is adjusted such that the flow rate of the air supplied to the oxygen-containing gas supply pipe 118 is increased, and the opening degree of the raw fuel regulator valve 136 is adjusted such that the flow rate of the raw fuel supplied to the raw fuel supply channel 100 is increased. Further, by operation of the water supply apparatus 18, the water is supplied to the water channel 104. As shown in FIG. 3, the air is supplied from the oxygen-containing gas supply pipe 118 to the heat recovery area 116 in the cover member 112. Thus, the air flows into the oxygen-containing gas supply chamber 114a.

Figure 10:
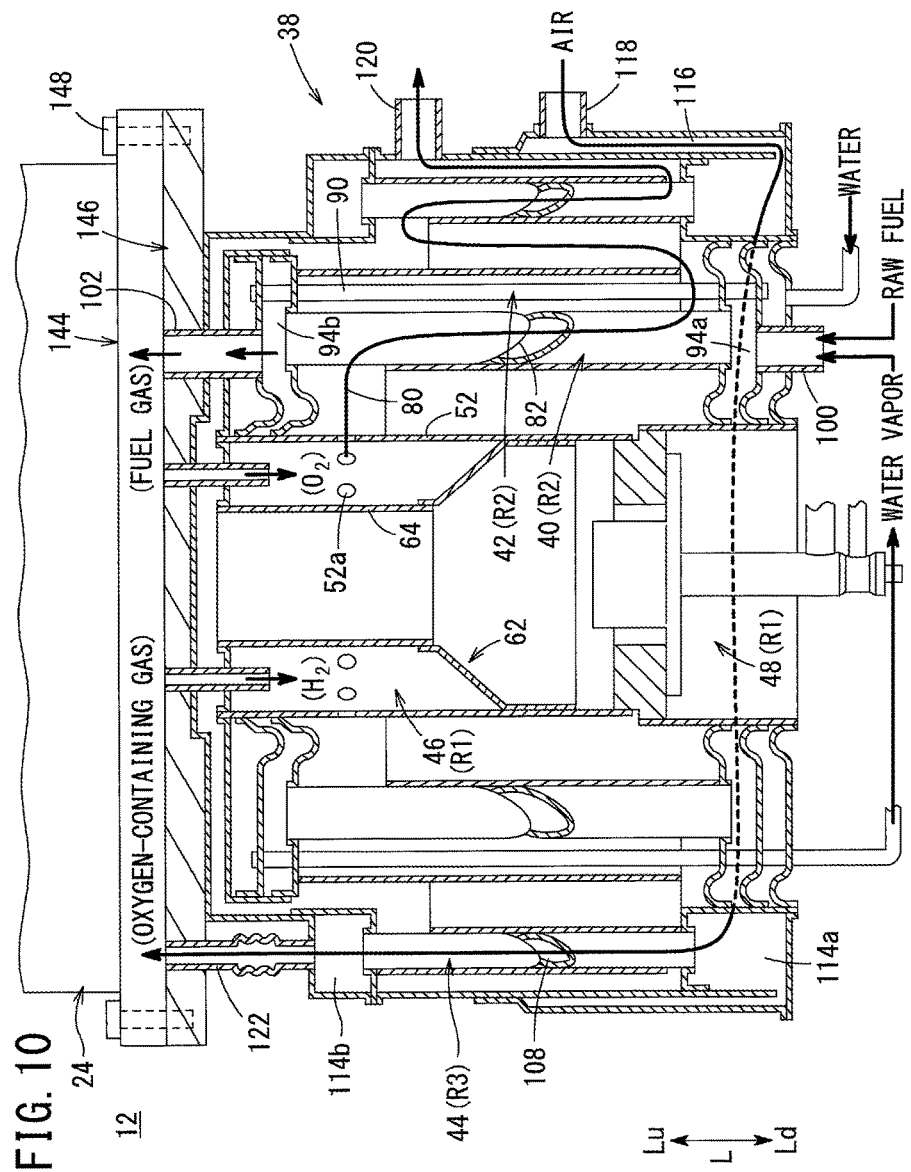
FIG. 10 is a view showing operation at the time of rated operation of the fuel cell module.
Figure 11:
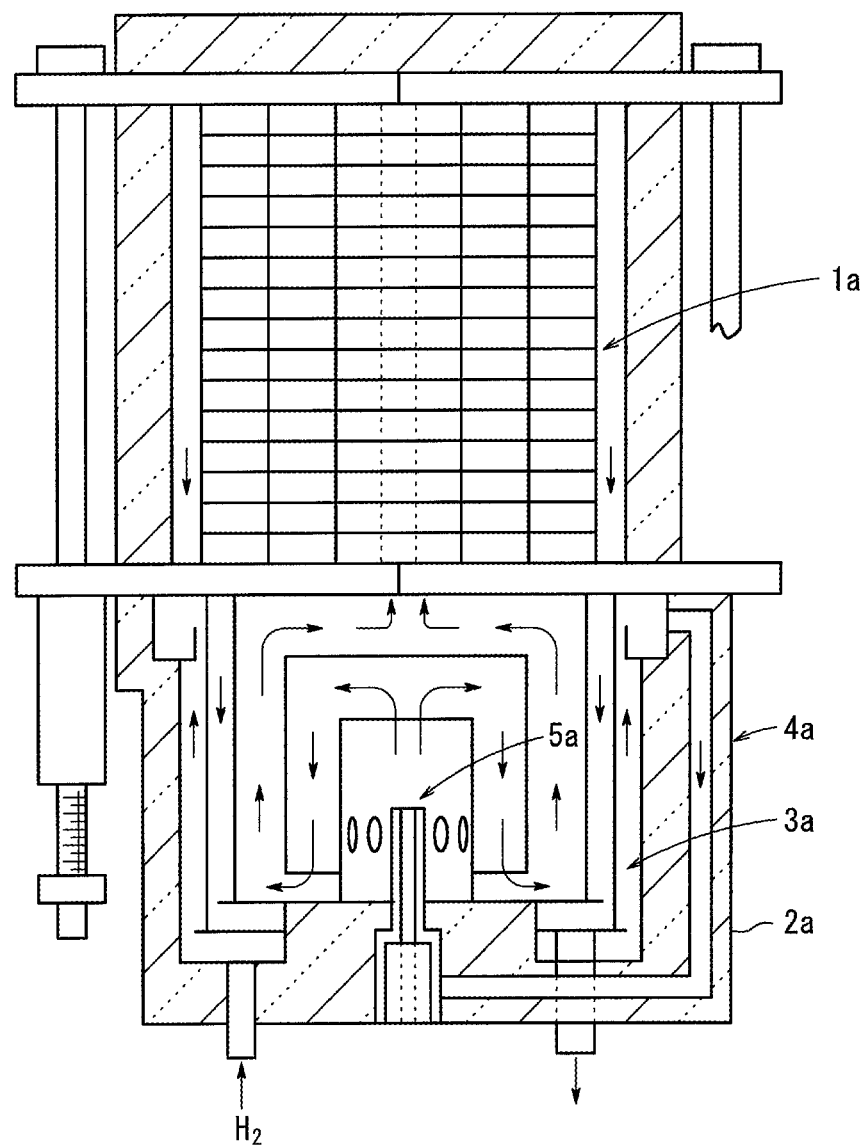
FIG. 11 is a view schematically showing a fuel cell battery disclosed in a conventional technique 1.
Figure 12:
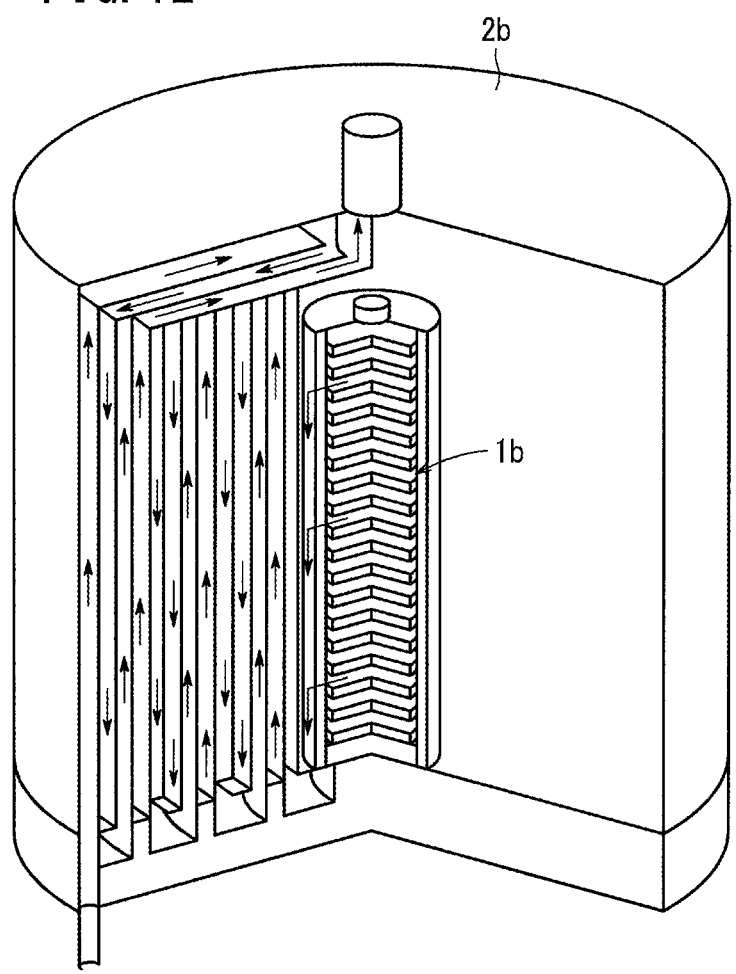
FIG. 12 is a perspective view with partial omission showing a solid oxide fuel cell disclosed in a conventional technique 2.
Figure 13:
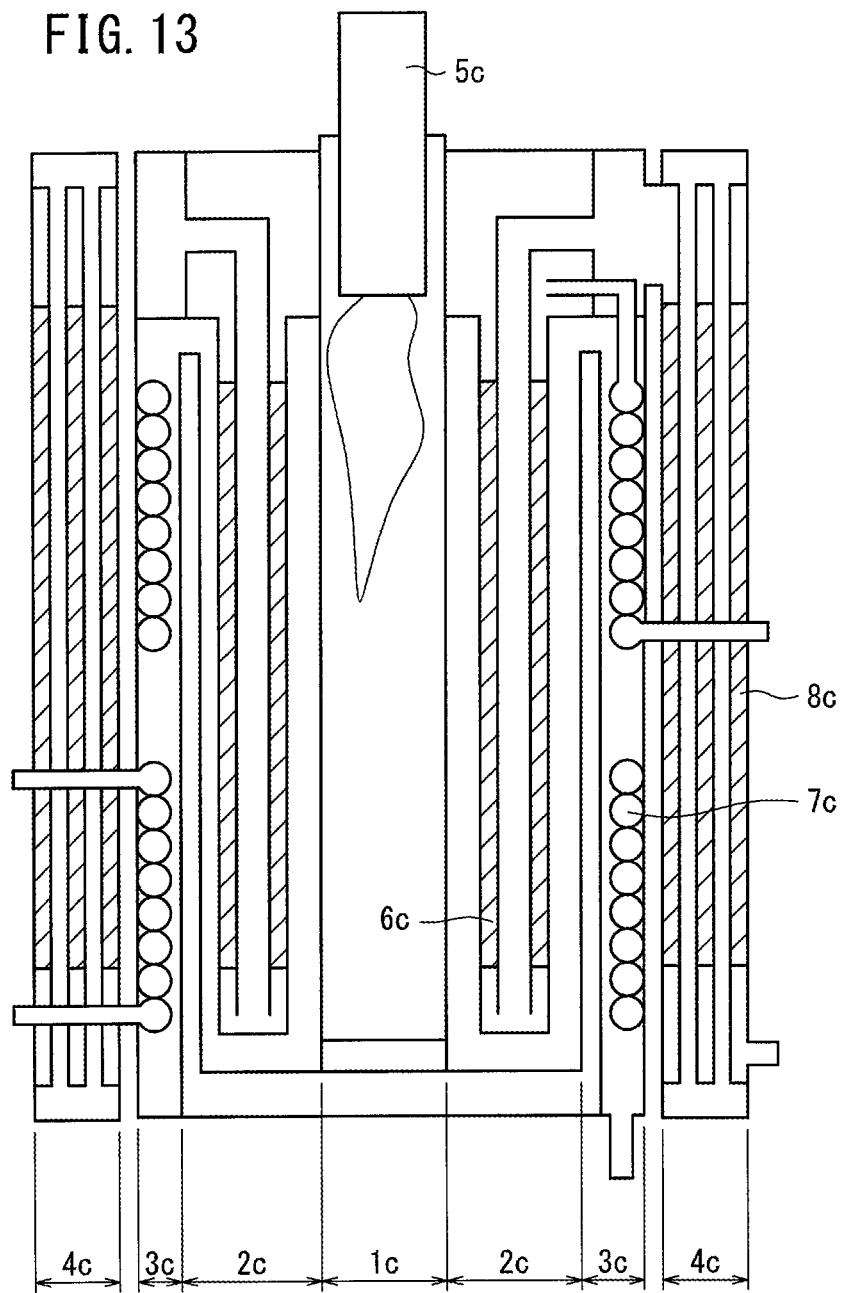
FIG. 13 is a view schematically showing a fuel cell system disclosed in a conventional technique 3.

Therefore, as shown in FIGS. 3 and 10, the air supplied into the heat exchanger 44 is temporarily supplied to the oxygen-containing gas supply chamber 114a. Thereafter, while the air is moving inside the heat exchange pipes 108, the air is heated by heat exchange with the combustion gas supplied into the third area R3 described later. After the heated air is temporarily supplied to the oxygen-containing gas discharge chamber 114b, the air is supplied to the oxygen-containing gas supply passage 34a of the fuel cell stack 24 through the oxygen-containing gas pipe 122 (see FIG. 1). In the fuel cell stack 24, the heated air is supplied to the cathode 28.

After the air flows along the cathode 28, the air is discharged from the oxygen-containing gas discharge passage 34b into the oxygen-containing exhaust gas channel 54a. The oxygen-containing exhaust gas channel 54a is opened to the tubular portion 52 of the exhaust gas combustor 46. Therefore, the oxygen-containing exhaust gas flows into a space between the inner circumference of the tubular portion 52 and the outer circumference of the tubular member 64.

Further, as shown in FIG. 1, the water from the water supply apparatus 18 is supplied to the evaporator 42. The raw fuel desulfurized by the desulfurizer 138 flows through the raw fuel supply channel 100 toward the reformer 40. In the evaporator 42, as shown in FIG. 3, after the water is temporarily supplied to the water supply chamber 98a, while the water is moving inside the evaporation pipes 90, the water is heated by the combustion gas flowing through the second area R2, and then vaporized.

After the water vapor temporarily flows into the water vapor discharge chamber 98b, the water vapor is supplied to the evaporation return pipe 106 connected to the water vapor discharge chamber 98b. Thus, the water vapor flows through the evaporation return pipe 106 into the raw fuel supply channel 100. Then, the water vapor is mixed with the raw fuel supplied by the raw fuel supply apparatus 14 to produce the mixed gas.

As shown in FIGS. 3 and 10, the mixed gas from the raw fuel supply channel 100 is temporarily supplied to the mixed gas supply chamber 94a of the reformer 40. The mixed gas moves inside the reforming pipes 82. During that time of moving through the reforming pipes 82, the mixed gas is heated by the combustion gas flowing through the second area R2, and subjected to steam reforming. As a result, removal (reforming) of hydrocarbon of $C_{2+}$ is carried out, whereby a reformed gas chiefly containing methane is obtained.

This reformed gas is temporarily supplied as the heated fuel gas to the fuel gas discharge chamber 94b. Thereafter, the fuel gas is supplied to the fuel gas supply passage 36a of the fuel cell stack 24 through the fuel gas channel 102 (see FIG. 1). In the fuel cell stack 24, the heated fuel gas is supplied to the anode 30. In the meanwhile, the air is supplied to the cathode 28. Consequently, electricity is generated in the electrolyte electrode assembly 32.

After the fuel gas flows through the anode 30, the fuel gas is discharged from the fuel gas discharge passage 36b to the fuel exhaust gas channel 54b. The fuel exhaust gas channel 54b is opened to the inside of the tubular portion 52 of the exhaust gas combustor 46, and the fuel exhaust gas is supplied into a space between the inner circumference of the tubular portion 52 and the outer circumference of the tubular member 64.

Under the heating operation by the start-up combustor 48, when the temperature of the fuel gas in the exhaust gas combustor 46 exceeds the self-ignition temperature, combustion of the oxygen-containing exhaust gas and the fuel exhaust gas is started inside the tubular portion 52. In the meanwhile, combustion operation by the start-up combustor 48 is stopped.

The tubular portion 52 has the plurality of holes 52a. In the structure, as shown in FIG. 10, the combustion gas produced between the inner circumference of the tubular portion 52 and the outer circumference of the tubular member 64 passes through the holes 52a, and flows into the combustion gas channel 80. In the combustion gas channel 80, as shown in FIG. 3, the combustion gas flows through the first combustion gas connection channel 72a formed in the first partition plate 72, and the combustion gas flows from the first area R1 to the second area R2.

After the combustion gas flows through the second area R2 in the direction indicated by the arrow Ld (in the downward direction), the combustion gas flows through the second combustion gas connection channel 74a formed in the second partition plate 74, and the combustion gas is supplied into a space between the second area R2 and the third area R3. The combustion gas flows in the direction indicated by the arrow Lu (upward direction), and then, the combustion gas flows through the third combustion gas connection channel 76a formed in the third partition plate 76 into the third area R3. After the combustion gas flows through the third area R3 in the direction indicated by the arrow Ld, the combustion gas is discharged from the fourth combustion gas connection channel 78a formed in the fourth partition plate 78 to the outer area. The combustion gas flows in the direction indicated by the arrow Lu, and the combustion gas is discharged into the exhaust gas pipe 120.

The reformer 40 and the evaporator 42 are provided in the second area R2, and the heat exchanger 44 is provided in the third area R3. In the structure, the combustion gas discharged from the first area R1 firstly heats the reformer 40, secondly heats the evaporator 42, and then heats the heat exchanger 44.

In the embodiment of the present invention, from the center to the outer circumference, the FC peripheral equipment 38 includes the central area and the plurality of outer annular areas formed around the central area. Therefore, in the outer annular areas, high temperature equipment requiring a larger amount of heat, such as the reformer 40 and the evaporator 42, can be provided in the inner second area R2, and low temperature equipment requiring a smaller amount of heat, such as the heat exchanger 44, can be provided in the outer third area R3.

Accordingly, improvement in the heat efficiency is achieved, and thermally self-sustaining operation is facilitated. In addition, simple and compact structure is achieved. The thermally self-sustaining operation herein means operation where the temperature of the fuel cell stack 24 is maintained at the operating temperature using only heat energy generated by the fuel cell stack 24 itself, without supplying additional heat from the exterior.

Further, the stress relaxing portion 124 for relaxing the heat stress is provided at least at the boundary between the central area and the adjacent outer annular area, or between the outer annular areas. Specifically, as shown in FIG. 8, the stress relaxing portion 124 includes the first curved portion 128a having the largest radius r1, and the second curved portion 128b and the third curved portion 128c formed respectively at both ends of the first curved portion 128a such that the spaces 130a, 130b lie respectively on the outer sides of the second and third curved portions 128b, 128c. The second curved portion 128b and the third curved portion 128c are curved in a direction opposite to the curved direction of the first curved portion 128a. That is, the stress relaxing portion 124 can be deformed easily and reliably in response to external stress.

In the structure, when the FC peripheral equipment 38 including the exhaust gas combustor 46, the start-up combustor 48, the reformer 40, the evaporator 42, and the heat exchanger 44 is thermally expanded, the heat stress in the radial direction and the axial direction is relaxed by the stress relaxing portion 124. Therefore, it becomes possible to suitably suppress degradation of the durability of the FC peripheral equipment 38 due to the heat stress.

Further, as shown in FIG. 7, in the FC peripheral equipment 38, the temperature tends to be decreased from the first area R1 to the third area R3 (in the direction indicated by the arrow B), and the temperature tends to be decreased in the direction away from the fuel cell stack 24 (in the direction indicated by the arrow Ld). Therefore, in the FC peripheral equipment 38, the temperature difference tends to occur in the radial direction and in the axial direction.

In this regard, the stress relaxing portion 124 is provided at least at each of the positions exposed to the hot exhaust gas. In this manner, when the FC peripheral equipment 38 is thermally expanded, the stress relaxing portion 124 can relax the heat stress in the radial direction and in the axial direction. Therefore, it becomes possible to suitably suppress degradation of the durability of the FC peripheral equipment 38 due to the heat stress.

In particular, the first upper ring member 84b and the second upper ring member 92b, which tend to be exposed to high temperature, have the plurality of curved portions (the first curved portion 128a, the second curved portion 128b, and the third curved portion 128c) at their inner circumferential portions. Thus, with the simple and economical structure, the stress relaxing portion 124 can reliably relax the stress in the radial direction and in the axial direction which occurs when the FC peripheral equipment 38 is expanded. Thus, improvement in the durability of the FC peripheral equipment 38 can be achieved.

Further, in comparison with the third curved portion 128c, the second curved portion 128b is remoter from a fixed end (i.e., an end closer to the tubular portion 52), and the radius r2 of the second curved portion 128b is larger than the radius r3 of the third curved portion 128c (r1>r2>r3). Therefore, the stress relaxing portion 124 can be deformed easily, and the stress relaxing portion 124 can suitably relax the heat stress. Further, since the first curved portion 128a having the maximum radius r1 can be provided closely to the fixed end, i.e., in proximity to the tubular portion 52, size reduction of the stress relaxing portion 124 is easily achieved.

Further, the arc length 128ae of the first curved portion 128a is greater than the arc length 128be of the second curved portion 128b, and the arc length 128be of the second curved portion 128b is greater than the arc length 128ce of the third curved portion 128c. In the structure, since the stress relaxing portion 124 can be deformed easily, it can suitably absorb the heat stress. Further, the first curved portion 128a having the maximum radius r1 can be provided closely to the fixed end, i.e., in proximity to the tubular portion 52, size reduction of the stress relaxing portion 124 can be achieved easily.

Moreover, as shown in FIG. 3, the reformer 40 includes the annular mixed gas supply chamber 94a and the annular fuel gas discharge chamber 94b. The mixed gas is supplied to the mixed gas supply chamber 94a, and the produced fuel gas is discharged into the fuel gas discharge chamber 94b. Further, the reformer 40 includes the plurality of reforming pipes 82 and the combustion gas channel 80. One end of each of the reforming pipes 82 is connected to the mixed gas supply chamber 94a, and the other end thereof is connected to the fuel gas discharge chamber 94b. The combustion gas is supplied through the combustion gas channel 80 into the spaces between the reforming pipes 82.

The evaporator 42 includes the annular water supply chamber 98a and the annular water vapor discharge chamber 98b. The water is supplied to the water supply chamber 98a, and the water vapor is discharged into the water vapor discharge chamber 98b. Further, the evaporator 42 includes the plurality of evaporation pipes 90 and the combustion gas channel 80. One end of each of the evaporation pipes 90 is connected to the water supply chamber 98a, and the other end thereof is connected to the water vapor discharge chamber 98b. The combustion gas is supplied through the combustion gas channel 80 into the spaces between the evaporation pipes 90.

The heat exchanger 44 includes the annular oxygen-containing gas supply chamber 114a, and the annular oxygen-containing gas discharge chamber 114b. The oxygen-containing gas is supplied to the oxygen-containing gas supply chamber 114a, and the heated oxygen-containing gas is discharged into the oxygen-containing gas discharge chamber 114b. Further, the heat exchanger 44 includes the plurality of heat exchange pipes 108 and the combustion gas channel 80. One end of each of the heat exchange pipes 108 is connected to the oxygen-containing gas supply chamber 114a, and the other end thereof is connected to the oxygen-containing gas discharge chamber 114b. The combustion gas is supplied through the combustion gas channel 80 into the spaces between the heat exchange pipes 108.

As described above, the annular supply chambers (mixed gas supply chamber 94a, water supply chamber 98a, oxygen-containing gas supply chamber 114a), the annular discharge chambers (fuel gas discharge chamber 94b, water vapor discharge chamber 98b, oxygen-containing gas discharge chamber 114b) and the pipes (reforming pipes 82, evaporation pipes 90, and heat exchange pipes 108) are provided as basic structure. Thus, simple structure is achieved easily. Accordingly, the production cost of the fuel cell module 12 is reduced as a whole effectively. Further, by changing the volumes of the supply chambers and the discharge chambers, the length, the diameter, and the number of the pipes, a desired operation can be achieved depending on various operating conditions, and a degree of freedom of design for the fuel cell module 12 can be enhanced.

Further, the mixed gas supply chamber 94a is formed between the first lower ring member (inner ring) 84a into which the ends of the reforming pipes 82 are inserted and the second lower ring member (outer ring) 92a spaced from the first lower ring member 84a. The fuel gas discharge chamber 94b is formed between the first upper ring member (inner ring) 84b into which the other ends of the reforming pipes 82 are inserted and the second upper ring member (outer ring) 92b spaced from the first upper ring member 84b.

The water supply chamber 98a is formed between the second lower ring member (inner ring) 92a into which the ends of the evaporation pipes 90 are inserted and the end ring member (outer ring) 96 spaced from the second lower ring member 92a. The water vapor discharge chamber 98b is formed between the second upper ring member (inner ring) 92b into which the other ends of the evaporation pipes 90 are inserted, and the partition plate (outer ring) 70 spaced from the second upper ring member 92b.

Likewise, the oxygen-containing gas supply chamber 114a is formed between the lower partition plate (inner ring) 86a into which the ends of the heat exchange pipes 108 are inserted and the lower end ring member (outer ring) 110 spaced from the lower partition plate 86a. The oxygen-containing gas discharge chamber 114b is formed between the upper partition plate (inner ring) 86b into which the other ends of the heat exchange pipes 108 are inserted and the upper end ring portion (outer ring) 50aa spaced from the upper partition plate 86b.

In the structure, the mixed gas supply chamber 94a, the fuel gas discharge chamber 94b, the water supply chamber 98a, the water vapor discharge chamber 98b, the oxygen-containing gas supply chamber 114a, and the oxygen-containing gas discharge chamber 114b are formed by the inner rings and the outer rings, respectively, and simple structure is achieved effectively. Accordingly, the production cost is reduced effectively, and the size reduction is achieved easily.

Further, the fuel gas discharge chamber 94b, the water vapor discharge chamber 98b, and the oxygen-containing gas discharge chamber 114b are provided at one end adjacent to the fuel cell stack 24. The mixed gas supply chamber 94a, the water supply chamber 98a, and the oxygen-containing gas supply chamber 114a are provided at the opposite end remote from the fuel cell stack 24.

Thus, it becomes possible to rapidly supply the heated reactant gasses (fuel gas and oxygen-containing gas) immediately after reforming, to the fuel cell stack 24. Further, it is possible to supply the exhaust gas from the fuel cell stack 24, to the exhaust gas combustor 46, the reformer 40, the evaporator 42, and the heat exchanger 44 of the FC peripheral equipment 38 while minimizing the decrease in the temperature due to heat dissipation. Accordingly, improvement in the heat efficiency is achieved, and thermally self-sustaining operation is facilitated.

Further, the stress relaxing portion 124 is provided in each of the inner ring and the outer ring of at least one of the fuel gas discharge chamber 94b, the water vapor discharge chamber 98b, and the oxygen-containing gas discharge chamber 114b. Therefore, when the FC peripheral equipment 38 including the exhaust gas combustor 46, the start-up combustor 48, the reformer 40, the evaporator 42, and the heat exchanger 44 is thermally expanded, the stress relaxing portion 124 relaxes the heat stress in the radial direction and in the axial direction. Accordingly, degradation in the durability of the FC peripheral equipment 38 due to the heat stress can be suppressed suitably.

Further, the stress relaxing portion 124 is provided in each of the inner ring and the outer ring of at least one of the mixed gas supply chamber 94a, the water supply chamber 98a, and the oxygen-containing gas supply chamber 114a. Therefore, when the FC peripheral equipment 38 is thermally expanded, the stress relaxing portion 124 relaxes the heat stress in the radial direction and in the axial direction. Accordingly, degradation in the durability of the FC peripheral equipment 38 due to the heat stress can be suppressed suitably.

Further, the stress relaxing portion 124 is formed by the curved portion provided on at least one of the inner portion and the outer portion of each of the inner rings and the outer rings. Therefore, with the simple and economical structure, the stress relaxing portion 124 can reliably relax the heat stress in the radial direction and the axial direction which is produced when the FC peripheral equipment 38 is expanded. Accordingly, improvement in the durability of the FC peripheral equipment 38 can be achieved.

Further, the fuel cell module 12 is a solid oxide fuel cell module. Therefore, the fuel cell module 12 is optimally applicable to high temperature type fuel cells such as SOFC.

The invention claimed is:

1. A fuel cell module comprising:
a fuel cell stack formed by stacking a plurality of fuel cells for generating electricity by electrochemical reactions of a fuel gas and an oxygen-containing gas;
a reformer for reforming a mixed gas of a raw fuel chiefly containing hydrocarbon and water vapor to produce the fuel gas supplied to the fuel cell stack;
an evaporator for evaporating water, and supplying the water vapor to the reformer;
a heat exchanger for raising a temperature of the oxygen-containing gas by heat exchange with a combustion gas, and supplying the oxygen-containing gas to the fuel cell stack;
an exhaust gas combustor for combusting the fuel gas discharged from the fuel cell stack as a fuel exhaust gas and the oxygen-containing gas discharged from the fuel cell stack as an oxygen-containing exhaust gas to produce the combustion gas; and
a start-up combustor for combusting the raw fuel and the oxygen-containing gas to produce the combustion gas,
wherein the fuel cell module includes:
a central area where the exhaust gas combustor and the start-up combustor are provided;
a plurality of outer annular areas around the central area and where the reformer, the evaporator, and the heat exchanger are provided; and
a stress relaxing portion for relaxing heat stress and which is provided at least along a boundary between the central area and the outer annular areas or a boundary between the outer annular areas; and
wherein the stress relaxing portion provided along the boundary between the central area and the outer annular areas includes a plurality of curved portions including a first curved portion having the largest radius, and a second curved portion and a third curved portion which are formed respectively at both ends of the first curved portion, wherein the second curved portion and the third curved portion are curved in a direction opposite a curved direction of the first curved surface such that a space is formed on an outer side of each of the second and third curved portions.

2. The fuel cell module according to claim 1, wherein, in comparison with the third curved portion, the second curved portion is remote from a fixed end provided at the boundary; and a radius of the second curved portion is greater than a radius of the third curved portion.

3. The fuel cell module according to claim 2, wherein an arc length of the first curved portion is greater than an arc length of the second curved portion, and an arc length of the second curved portion is greater than an arc length of the third curved portion.

4. The fuel cell module according to claim 1, wherein the reformer includes an annular mixed gas supply chamber to which the mixed gas is supplied, an annular fuel gas discharge chamber to which the produced fuel gas is discharged, a plurality of reforming pipes each having one end connected to the mixed gas supply chamber, and another end connected to the fuel gas discharge chamber, and a combustion gas channel for supplying the combustion gas between the reforming pipes;

the evaporator includes an annular water supply chamber to which the water is supplied, an annular water vapor discharge chamber to which the water vapor is discharged, a plurality of evaporation pipes each having one end connected to the water supply chamber, and another end connected to the water vapor discharge chamber, and a combustion gas channel for supplying the combustion gas between the evaporation pipes; and the heat exchanger includes an annular oxygen-containing gas supply chamber to which the oxygen-containing gas is supplied, an annular oxygen-containing gas discharge chamber to which the heated oxygen-containing gas is discharged, a plurality of heat exchange pipes each having one end connected to the oxygen-containing gas supply chamber, and another end connected to the oxygen-containing gas discharge chamber, and a combustion gas channel for supplying the combustion gas between the heat exchange pipes.

5. The fuel cell module according to claim 4, wherein the mixed gas supply chamber and the fuel gas discharge chamber are each formed between an inner ring into which ends of the reforming pipes are inserted and an outer ring spaced away from the inner ring;

the water supply chamber and the water vapor discharge chambers are each formed between an inner ring into which ends of the evaporation pipes are inserted and an outer ring spaced away from the inner ring; and the oxygen-containing gas supply chamber and the oxygen-containing gas discharge chamber are each formed between an inner ring into which ends of the heat exchange pipes are inserted and an outer ring spaced away from the inner ring.

6. The fuel cell module according to claim 4, wherein the fuel gas discharge chamber, the water vapor discharge chamber, and the oxygen-containing gas discharge chamber are provided at one end adjacent to the fuel cell stack; and the mixed gas supply chamber, the water supply chamber, and the oxygen-containing gas supply chamber are provided at the opposite end remote from the fuel cell stack.

7. The fuel cell module according to claim 5, wherein the stress relaxing portion is provided in each of the inner ring and the outer ring of at least one of the fuel gas discharge chamber, the oxygen-containing gas discharge chamber, and the water vapor discharge chamber.

8. The fuel cell module according to claim 5, wherein the stress relaxing portion is provided in each of the inner ring and the outer ring of at least one of the mixed gas supply chamber, the water supply chamber, and the oxygen-containing gas supply chamber.

9. The fuel cell module according to claim 5, wherein the stress relaxing portion is formed by at least inner circumferential portions or outer circumferential portions of the inner ring and the outer ring.

10. The fuel cell module according to claim 1, wherein the fuel cell module is a solid oxide fuel cell module.

\* \* \* \* \*